United States Patent [19]

Gray

[11] Patent Number: 5,073,325

[45] Date of Patent: * Dec. 17, 1991

[54] METHOD FOR PRODUCING A MOLDED ARTICLE HAVING STABILIZED DECORATIVE FEATURES

[75] Inventor: John D. Gray, Union, N.H.

[73] Assignee: Davidson Textron Inc., Dover, N.H.

[*] Notice: The portion of the term of this patent subsequent to Nov. 14, 2006 has been disclaimed.

[21] Appl. No.: 381,377

[22] Filed: Jul. 18, 1989

[51] Int. Cl.⁵ .................. B28B 1/32; B29C 39/12; B29C 41/08
[52] U.S. Cl. .................. 264/245; 264/255; 264/301; 264/309; 264/310; 264/327
[58] Field of Search .................. 264/245–247, 264/255, 327, 310, 301, 302, 309

[56] References Cited

U.S. PATENT DOCUMENTS

| | | | |
|---|---|---|---|
| 1,612,825 | 1/1927 | Lynch | 264/245 |
| 2,587,594 | 3/1952 | Chavannes et al. | 264/245 X |
| 3,351,510 | 11/1967 | Harris | 264/246 X |
| 3,504,063 | 3/1970 | Lemelson . | |
| 4,420,525 | 12/1983 | Parks | 264/245 X |
| 4,528,227 | 7/1985 | Frechtmann | 264/245 X |
| 4,650,623 | 3/1987 | Berger | 264/246 X |
| 4,769,191 | 9/1988 | Diana | 264/245 X |
| 4,776,996 | 10/1988 | Ashton et al. | 264/255 X |
| 4,810,452 | 3/1989 | Taillefert et al. | 264/247 |
| 4,851,177 | 7/1989 | Gray | 264/297.6 |
| 4,880,588 | 11/1989 | Brault et al. | 264/163 |
| 4,882,173 | 11/1989 | LaRoche et al. | 425/130 |
| 4,895,690 | 1/1990 | LaRoche et al. | 264/245 |

FOREIGN PATENT DOCUMENTS

| | | |
|---|---|---|
| 2038342 | 3/1972 | Fed. Rep. of Germany . |
| 9142112 | 8/1984 | Japan . |
| 9142113 | 8/1984 | Japan . |
| 2174953 | 11/1986 | United Kingdom . |

Primary Examiner—Jan H. Silbaugh
Assistant Examiner—Karen Aftergut
Attorney, Agent, or Firm—John C. Evans

[57] ABSTRACT

A method for manufacturing decorative features in situ in a base layer of cast plastic material includes the steps of providing a heated mold tool with a selectively heated surface in the form of a desired decorative feature; depositing a covering of thermoplastic material in the recessed surface and heating the recessed surface to partially fuse the thermoplastic material on the recessed surface to form segments of plastic corresponding to the desired decorative feature; dumping excess thermoplastic material from the heated mold tool; thereafter spray coating the mold at the recessed surface to stabilize the location of the partially fused material in the recessed surface; reheating the mold tool to partially remelt the retained stabilized segments and thereafter depositing a base layer of thermoplastic material across the full surface of the mold and reheating the mold to bond the retained stabilized segments to the base layer and cooling and stripping the mold to form a finished plastic shell having a decorative feature formed in situ therein.

6 Claims, 1 Drawing Sheet

METHOD FOR PRODUCING A MOLDED ARTICLE HAVING STABILIZED DECORATIVE FEATURES

TECHNICAL FIELD

This invention relates to a method for forming thin walled hollow shells for products made from thermoplastic material, and more particularly, to a method for manufacturing such shells to have decorative features formed in situ.

BACKGROUND OF THE PRIOR ART

The use of thin walled plastic shells for products have included a cast shell of thermoplastic material with a decorative feature formed therein. One example is set forth in U.S. Pat. No. 4,610,620, which discloses apparatus for molding plural colored plastic hollow shells by a process in which a decorative pinstripe is formed as an integrally bonded joint between first and second segments of the shell. The joint between the shell components is used to replace a mechanical connection therebetween and to provide a pinstripe decorative feature in the shell component. However, the decorative pinstripe is formed only along the joint line of the joined parts and is not formed in situ in a base layer.

U.S. Pat. No. 4,562,025 discloses a mold method and apparatus for multicolored plastic shells which have first and second colored segments on the cast shell portions of the finished product. However, there are no decorative features formed in situ on the cast shell components of the trim part.

U.S. Pat. No. 4,562,032 discloses a method for forming grain coverings on reaction injection molded articles. Such grained shells are formed, in some cases, to have an integrally formed stitching feature around the perimeter thereof to provide an appearance of stitched materials.

U.K. Patent Application GB 2,174,953A discloses a rotational mold process wherein indicia is first cast and fused in a recessed mold. The recessed mold is then connected to a rotational mold to deposit a backing layer of thermoplastic material. There is no suggestion of an intermediate step to stabilize and protect partially fused material on a mold for subsequent handling.

While the above patents disclose shells cast from thermoplastic material which include decorative color and trim features, they do not disclose a method for providing decorative features such as colored lettering or colored stitching in situ on an eye discernible surface of a finished article wherein the decorative feature is partially fused, protected and stabilized prior to rotational molding a base layer thereon.

STATEMENT OF INVENTION AND ADVANTAGES

In the present invention, one feature is to provide a method for forming decorative features in situ of the eye discernible surface of shells cast from thermoplastic materials by a process which includes protecting and stabilizing partially fused indicia before a backing layer is cast thereon by rotational molding.

Another feature of the present invention is to provide a process for making in situ decorative features in an eye discernible surface of a plastic shell formed from cast thermoplastic materials wherein the eye discernible features are formed of partially fused thermoplastic material which is first protected and stabilized by a sprayed-on stabilization coat and thereafter rotationally molded to be formed in situ of a base layer by the same tooling as used to form the partially fused features.

Yet another feature of the present invention is to provide an improved process for manufacturing plastic trim components for use in automobiles wherein a colored decorative feature is formed by the use of the same tooling used for producing a shell of thermoplastic material and comprising the steps of: providing a mold with a recessed surface; depositing and selectively heating thermoplastic material in the recessed surface to form partially fused indicia only in the recesses; dumping excess material from the mold, thereafter spray depositing a coating on the indicia to stabilize the location of the indicia and to protect it during subsequent handling; and then reheating the mold and depositing a base layer thereon.

The invention, in one embodiment, forms stitch features in a thermoplastic shell by the process of depositing thermoplastic material against a heated mold surface having a stitch formation formed in the mold surface by further improvements comprising the steps of: providing a stitch groove in the mold surface; selectively heating the mold surface and thereafter depositing thermoplastic material in the stitch groove to form a stitch pattern of partially fused thermoplastic material in the stitch groove; removing excessive material from the mold; spray coating a stabilization coat on the stitch pattern to hold it in place and to protect during mold handling; and thereafter reheating the mold to partially remelt the retained stitch pattern and depositing a base layer of thermoplastic material on the heated mold so as to form the retained stitch pattern in situ in the base layer as an eye discernible color contrasting decorative feature therein.

Other advantages and a more complete understanding of the invention will be more apparent from the succeeding detailed description of the invention and the accompanying drawings thereof.

DETAILED DESCRIPTION OF THE INVENTION

The process of the present invention will be described with reference to production of a plastic shell for use as an automotive trim product with it being understood that other plastic products requiring an in situ decorative feature therein are equally suitable for manufacture by the process of the present invention.

Figure 1:
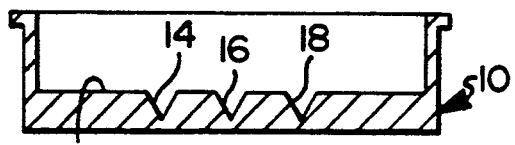
FIG. 1 is a diagrammatic view of a mold for casting thermoplastic material into a recessed surface on the mold.
Figure 2:
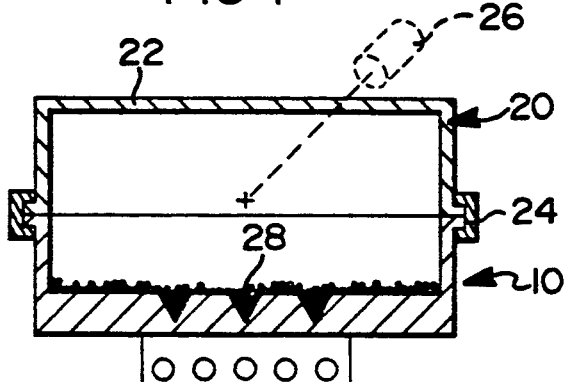
FIG. 2 is a diagrammatic view of a mold and a joined powder box casting a thermoplastic layer into a selectively heated mold.

Referring to FIG. 1, a mold 10 is illustrated having a mold surface 12 thereon, a plurality of recesses 14, 16, 18 forming indicia such as stitching of the type found on molded instrument panels. While the logo is shown as a part having a reduced planar extent, it should be understood that it can be formed on an extended surface mold of the type used to form larger plastic products such as luggage shells or instrument panel shells or other large area plastic products.

The improved process includes heating the mold tool 10 only at the recesses 14, 16, 18 and joining the heated mold 10 to rotational molding apparatus 20. The molding apparatus includes a powder box 22 for containing thermoplastic powder, e.g. polyvinyl chloride resin particles with a suitable plasticizer and pigmentation as one specifically described in U.S. Pat. No. 4,784,911 issued Nov. 11, 1988 to a common assignee. The powder box 22 is joined to the heated mold 10 by clamps 24. A rotating drive assembly 26 is operative to invert the powder box 22 to cast thermoplastic particles 28 into the recesses 14, 16, 18 where they are partially fused by selectively heating only the recesses with a heater 29 to form exposed upper surfaces 33 on the retained segments 28a.

The partially fused material in the recesses 14, 16, 18 is retained therein during a dumping step in which excess material is dumped from the mold 10.

Figure 3:
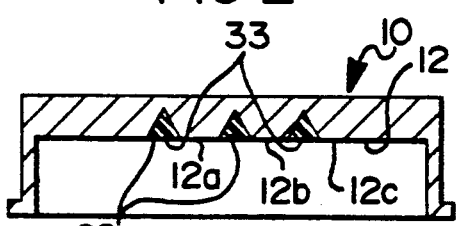
FIG. 3 is a diagrammatic view of the mold following partial fusing of the thermoplastic material in the recesses.
Figure 4:
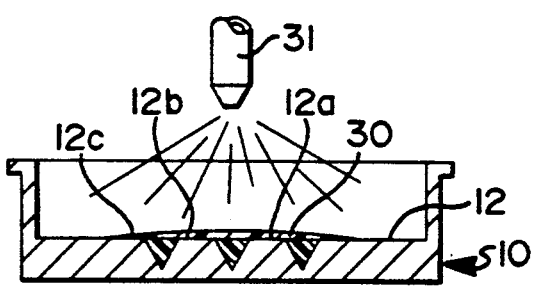
FIG. 4 is a diagrammatic view of a separate mold with retained decorative segments therein having a protective locating coat deposited thereon.

The tool 10 with retained segments 28a is shown in FIG. 3. The mold is then sprayed with a coating 30 of plastisol. The coating 30 is applied by spray apparatus 31 only at the recesses 14, 16, 18 and extends around the perimeter of the recesses 14, 16, 18 to retain the location of the partially fused segments 28a in place on the mold 10. The coating also serves to protect the segments 28a during mold handling. More particularly, the coating 30 will cover the mold surface segments 12a, b, c of mold surface 12. The top of each of the segments 28a is also covered. The coating 30 will hold the partially fused particles in the recesses 14, 16, 18 and will prevent such particles from being detached to flow onto the mold surface 12 in a manner which will diminish the definition of the indicia at its margins. Additionally, the coating 30 will protect the segments 28a during mold handling required in manufacturing processes in which a mold with partially fused indicia is moved from dumped position of FIG. 3 to rotational mold apparatus for distributing a backing layer of thermoplastic material onto the mold which forms the shell of a manufactured part with indicia thereon.

Figure 5:
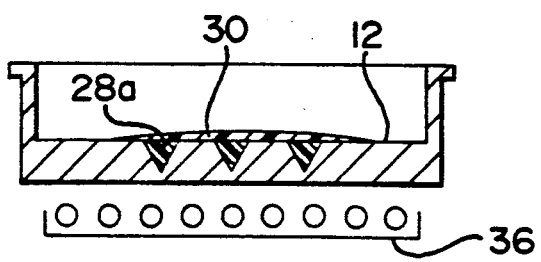
FIG. 5 is a diagrammatic view of the protective coating and the retained decorative segments and a heater for heating the full mold surface.
Figure 6:
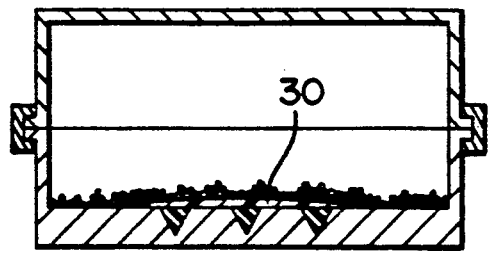
FIGS. 6-8 are diagrammatic views of rotational casting tooling used to form a backing of thermoplastic material on the fused and coated indicia.
Figure 7:
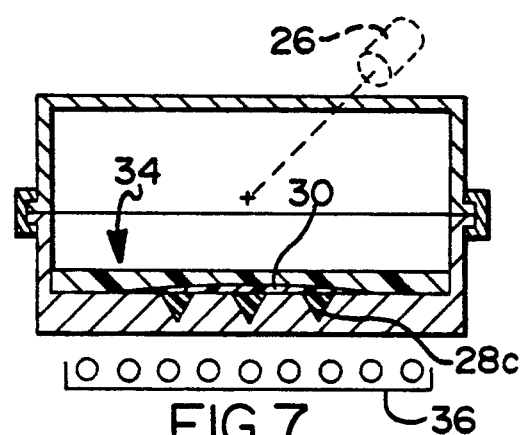
Figure 8:
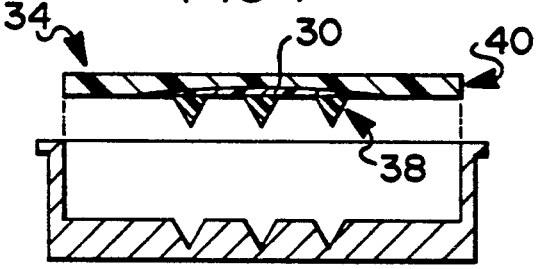
Figure 9:
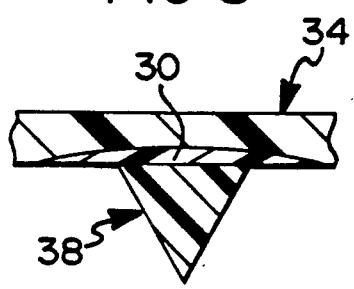
FIG. 9 is an enlarged fragmentary view of a fragment of the finished product.

The next step of the process is to remelt the retained segments 28a and the coating 30 (FIG. 5) and to cast a base layer 34 of thermoplastic material against the coating 30 and the mold surface 12, if uncovered as shown in FIG. 6. After the complete shell has been cast, the mold is heated to a temperature by heater 36 to cure (and completely fuse) base layer 34, the coating 30 and the segments 28a. The mold 10 is stripped as shown in FIG. 8 to form an in situ decorative feature 38 on a substrate (base layer) 34 of a part 40. The decorative feature 38 is raised from the substrate 34 as shown in FIG. 9. It has a contrasting color to that of the substrate 34.

The coating 30 can be either a clear coat or a pigmented material of the same hue as the base layer 34. Then the mold is connected to a suitable distribution system for casting dry powder thermoplastic material across the entire mold which has a color contrasting to the partially remelted segments 28a but the same as the coating 30. In one embodiment, the base layer of the trapped segments 28a are stitches and the stripped product is a shell 40 having an in situ integrally formed stitch pattern 38 formed on the surface thereof in color contrasting relationship to its base layer 34.

While representative embodiments of apparatus and process of the present invention have been shown and discussed, those skilled in the art will recognize that various changes and modifications may be made within the scope and equivalency range of the present invention.

What is claimed is:

1. In a process for forming a decorative feature in situ in a base layer of a plastic shell made from thermoplastic material cast against a heated tool having a mold surface and having a mold up and a mold down position the improvement comprising:

forming a recessed surface on the mold surface corresponding to a desired decorative feature;

selectively heating only the recessed surface of the mold surface;

depositing first thermoplastic material in the selectively heated recessed surface of the mold when the mold surface is in its mold up position and partially fusing the deposited material only in the selectively heated recessed surface to form an exposed upper surface;

protectively coating and stabilizing the location of the first thermoplastic material within the recessed surface by spraying only the exposed upper surface of the partially fused material in the recessed surface and surface segments of the mold surface located adjacent the recessed surface with plastisol material to form a coating across the exposed upper surface of the partially fused material so as to prevent migration of the partially fused material from the recessed surface;

heating the mold surface of the tool including the recessed surface and the surface segments of the mold surface located adjacent the recessed surface to heat the coating and the partially fused material in the recessed surface;

fusing a base layer of second thermoplastic material across the full surface of the mold and bonding it to the coating and the partially fused material in the recessed surface while fully fusing the material in the recessed surface; and cooling and stripping the base layer of second thermoplastic material and the fully fused material in the recessed surface from the mold surface so as to form a shell with a decorative feature.

2. In the combination of claim 1, wherein the spraying step includes spraying a liquid dispersion of the thermoplastic material against the partially fused material and across a limited contiguous surface of the mold surface adjacent thereto; and curing the liquid dispersion to form a protective layer of plastic over and around the partially fused material in the recesses.

3. In the combination of claim 1, said first thermoplastic material being deposited as a dry powder on the selectively heated recessed surface of the mold; excess dry powder being dumped from the heated mold to retain only powder in the recessed surface prior to the spraying of a coating thereon.

4. In a process for forming a colored stitch feature in a thermoplastic shell which is formed by depositing material against a heatable mold tool having a mold up and a mold down position and having a stitch formation formed in the mold surface the improvement comprising:

providing a groove in the mold surface for defining a stitch formation;

selectively heating only the groove in the mold surface;

depositing thermoplastic material in the stitch groove and partially fusing the material in the stitch groove to form stitching having an exposed upper surface;

protectively coating and stabilizing the location of the first thermoplastic material within the stitch groove by spraying a coating only on the exposed upper surface of the partially fused material in the groove and surface segments of the mold surface located adjacent the groove to prevent migration of the partially fused material in the exposed upper surface across the adjacent surfaces of the mold;

heating the mold to heat the partially fused material to fully fuse the partially fused material and to heat the coating and depositing a base layer of thermoplastic material on the mold for bonding the coating and the fully fused material to the base layer; and cooling and stripping the base layer, coating and fully fused material from the mold.

5. In the combination of claim 4, wherein the spraying step includes spraying a liquid dispersion of thermoplastic material over the material in the stitch groove and across a limited contiguous surface of the mold surface adjacent thereto; and curing the liquid dispersion to form a protective layer of plastic over and around the partially fused material in the stitch groove.

6. In the combination of claim 4, said thermoplastic material being deposited as a dry powder on the selectively heated stitch groove of the mold; excess dry powder being dumped from the heated mold to retain only powder in the stitch groove prior to the spraying of a coating thereon.

* * * * *